(12) United States Patent
Zimmerman et al.

(10) Patent No.: US 8,641,120 B2
(45) Date of Patent: Feb. 4, 2014

(54) VEHICLE STORAGE COMPARTMENT ASSEMBLY

(75) Inventors: Michael Zimmerman, Wixon, MI (US); Tomoki Oogushi, Saitama (JP)

(73) Assignee: Nissan North America, Inc., Franklin, TN (US)

( * ) Notice: Subject to any disclaimer, the term of this patent is extended or adjusted under 35 U.S.C. 154(b) by 139 days.

(21) Appl. No.: 13/305,847

(22) Filed: Nov. 29, 2011

(65) Prior Publication Data
US 2013/0134729 A1     May 30, 2013

(51) Int. Cl.
*B60R 7/04*     (2006.01)

(52) U.S. Cl.
USPC ........................................ 296/24.34; 296/37.8

(58) Field of Classification Search
USPC ................ 296/24.34, 37.1, 37.6, 37.8, 37.12, 296/37.13, 37.14, 37.16
See application file for complete search history.

(56) References Cited

U.S. PATENT DOCUMENTS

| 5,520,313 | A | 5/1996 | Toshihide | |
|---|---|---|---|---|
| 5,620,122 | A | 4/1997 | Tanaka | |
| 6,715,727 | B2 * | 4/2004 | Sambonmatsu | 248/311.2 |
| 6,726,267 | B2 | 4/2004 | Kim et al. | |
| 6,761,388 | B2 * | 7/2004 | Lein et al. | 296/24.34 |
| 6,866,319 | B2 * | 3/2005 | Hupfer | 296/37.8 |
| 7,226,029 | B2 | 6/2007 | Hoshi | |
| 7,481,343 | B2 | 1/2009 | Misumi | |
| 7,731,254 | B2 | 6/2010 | Lota | |
| 7,784,843 | B2 * | 8/2010 | Lota et al. | 296/24.34 |
| 7,794,000 | B2 * | 9/2010 | Ichimaru | 296/24.34 |
| 7,806,451 | B2 * | 10/2010 | Lota | 296/24.34 |
| 7,862,096 | B2 | 1/2011 | Kim et al. | |
| 8,231,164 | B2 * | 7/2012 | Schubring et al. | 296/37.14 |
| 2005/0023280 | A1 | 2/2005 | Kondo | |
| 2006/0049653 | A1 * | 3/2006 | Wakou et al. | 296/37.13 |
| 2011/0095555 | A1 * | 4/2011 | Penner | 296/24.34 |
| 2013/0026778 | A1 * | 1/2013 | Biggs | 296/37.8 |
| 2013/0134729 | A1 * | 5/2013 | Zimmerman et al. | 296/24.34 |

FOREIGN PATENT DOCUMENTS

| JP | 09-249059 A | 9/1997 |
|---|---|---|
| JP | 2003-025893 A | 1/2003 |

* cited by examiner

*Primary Examiner* — Glenn Dayoan
*Assistant Examiner* — Gregory Blankenship
(74) *Attorney, Agent, or Firm* — Global IP Counselors, LLP (57) ABSTRACT

A vehicle storage compartment assembly includes a housing, a lid, a trim member and a plurality of ribs. The housing defines a storage compartment area with a first access opening. A wall within the storage compartment area includes a ledge spaced apart from the first access opening. A first end of the lid is pivotally coupled to the housing to move between an open position in which a second end is spaced apart from the ledge and a closed position in which the second end is located adjacent to the ledge. A flange of the trim member at least partially surrounds a second access opening of the trim member, with the flange extending into the first access opening. A recess is defined by the wall between the flange and the ledge. The plurality of ribs extend from the ledge of the wall toward the flange within the recess.

22 Claims, 12 Drawing Sheets

VEHICLE STORAGE COMPARTMENT ASSEMBLY

BACKGROUND

1. Field of the Invention

The present invention generally relates to a vehicle storage compartment assembly. More specifically, the present invention relates to a storage compartment assembly with a wall that includes a plurality of ribs proximate an access opening of the storage compartment that make it easy to remove small items from the storage compartment.

2. Background Information

The passenger compartments of most vehicles include an instrument panel (also referred to as a dashboard) and a center console, where at least one or both of the instrument panel and the center console includes a storage compartment. When small objects, such as coins, are stored in the storage compartments, such objects tend to lie flat against the interior surfaces of the storage compartment, making removal of the object difficult. Further, if a trim panel overlaps an edge of an access opening of the storage compartment, small objects can become trapped between an edge of the trim panel and the interior surface of the storage compartment.

SUMMARY

One object of the invention is to provide a storage compartment with shaped surfaces that make it easy to remove small objects from the storage compartment.

In view of the state of the known technology, one aspect of the present disclosure is to provide a vehicle storage compartment assembly with a housing, a lid, a trim member and a plurality of ribs. The housing defines a storage compartment area with a first access opening. The housing also includes a wall with a ledge that is located within the storage compartment area and that is spaced apart from the first access opening. The lid has a first end and a second end. The first end is pivotally coupled to the housing to move between an open position in which the second end is spaced apart from the ledge and a closed position in which the second end is located adjacent to the ledge. The trim member defines a second access opening. The trim member includes a flange that at least partially surrounds the second access opening. The flange extends into the first access opening and the flange is spaced apart from the ledge such that a recess is defined by the wall of the housing between the flange and the ledge. Each of the plurality of ribs extends from the ledge of the wall toward the flange within the recess.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
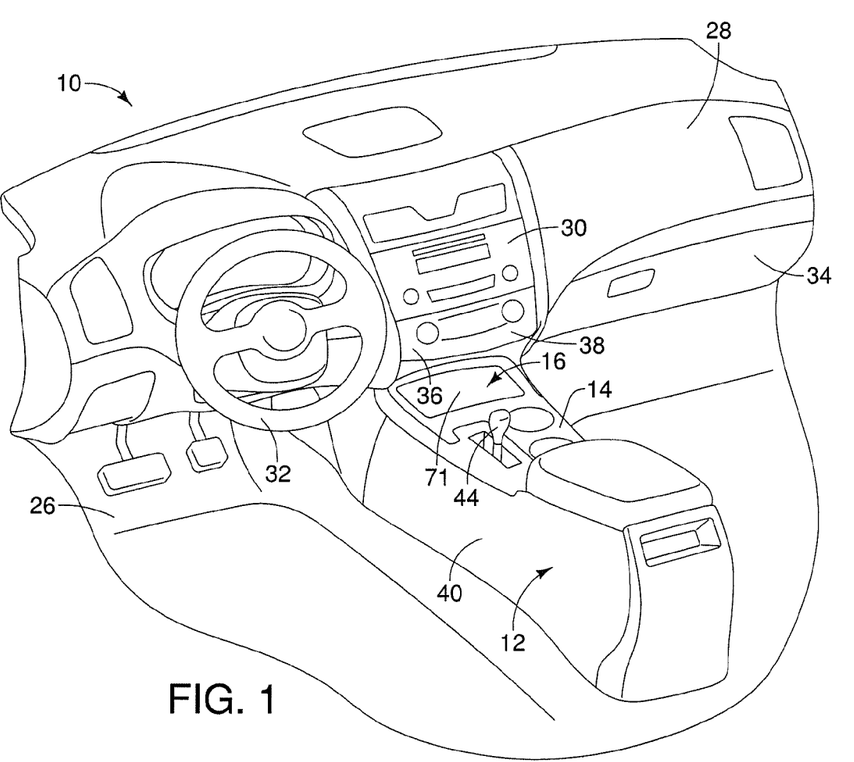
FIG. 1 is a perspective view of a passenger compartment of a vehicle showing an instrument panel and a center console that includes a storage compartment assembly and a trim panel in accordance with a first embodiment.
Figure 3:
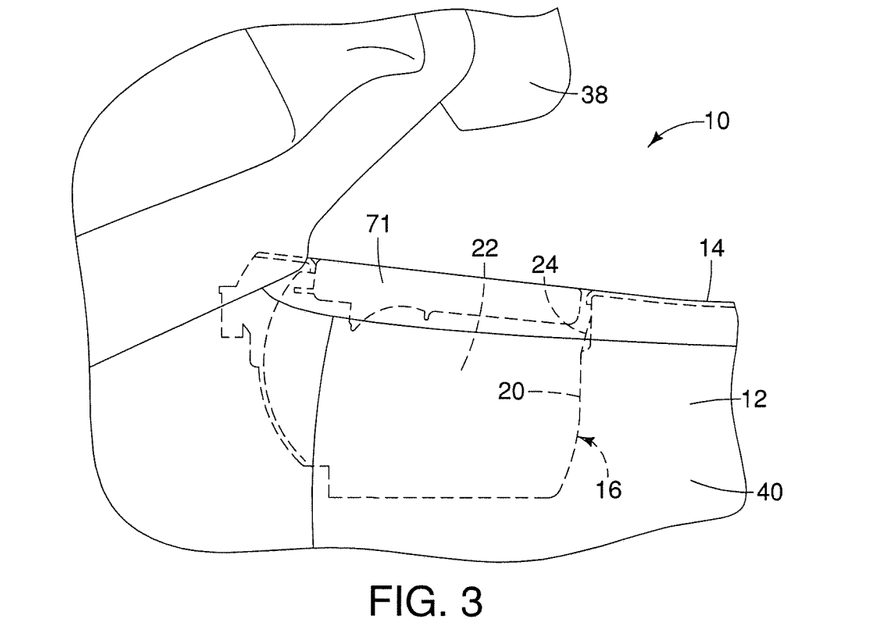
FIG. 3 is a side view of the center console and the instrument panel showing the storage compartment assembly in phantom lines with a lid of the storage compartment assembly in a closed position in accordance with the first embodiment.
Figure 4:
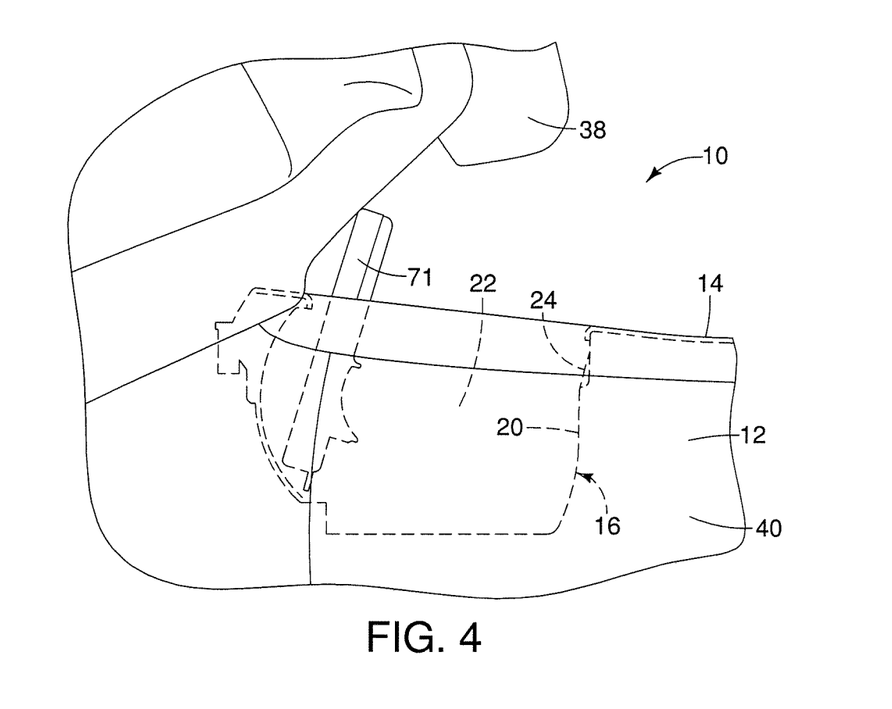
FIG. 4 is another side view of the center console and the instrument panel similar to FIG. 3, showing the lid of the storage compartment assembly in an open position in accordance with the first embodiment.
Figure 5:
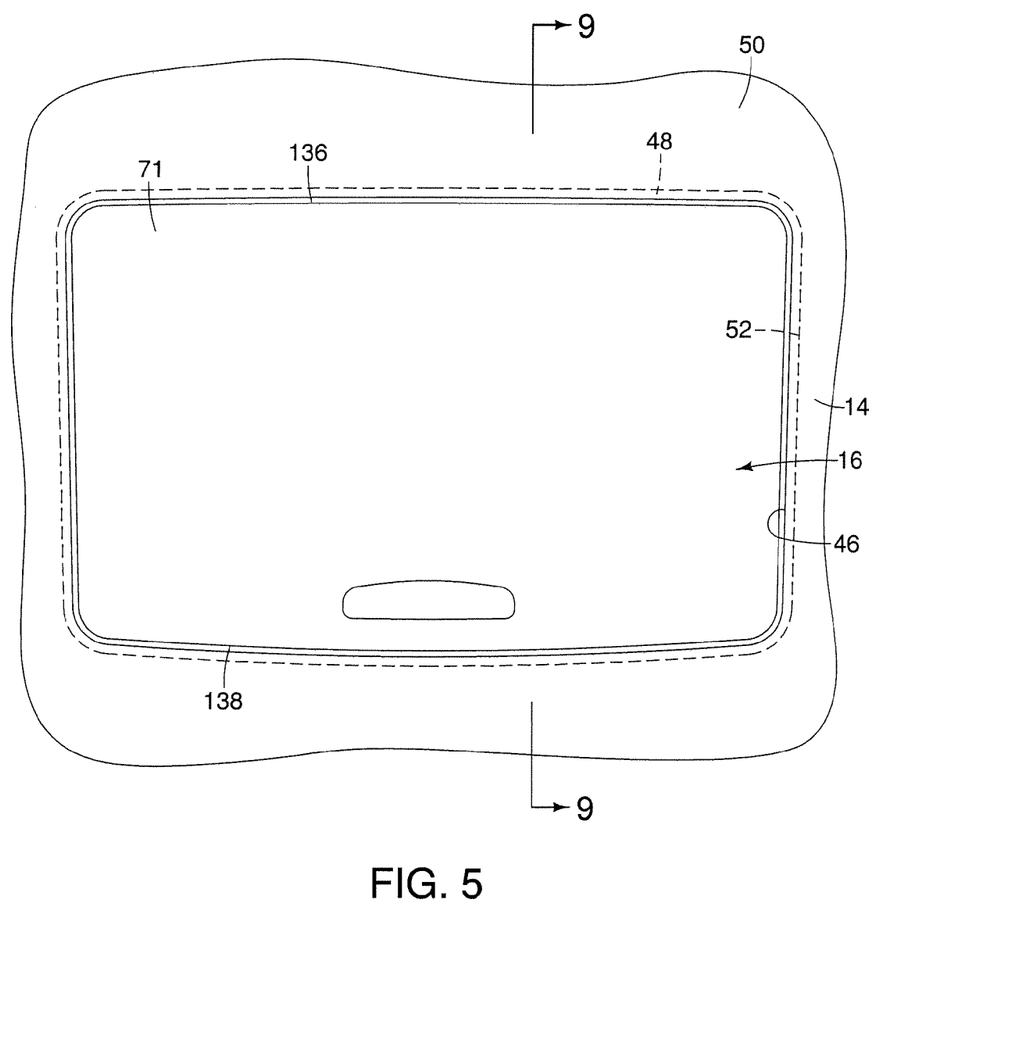
FIG. 5 is a top view of the center console showing the trim panel and the lid of the storage compartment assembly in accordance with the first embodiment.

Referring initially to FIG. 1, a passenger compartment 10 of a vehicle is illustrated in accordance with a first embodiment. As shown in FIGS. 1-4, the passenger compartment 10 includes a center console 12 with a trim panel 14 and a storage compartment assembly 16 (FIGS. 3 and 4) disposed beneath the trim panel 14. The storage compartment assembly 16 includes a wall 20 that partially defines a storage chamber or storage compartment 22 (a storage compartment area), as indicated in FIGS. 3 and 4. The wall 20 includes a plurality of ribs 24 that make it easy to remove small items from the storage compartment 22 that would otherwise lie against flat surfaces making it more difficult to remove the small items. A more detailed description of the wall 20 and the plurality of ribs 24 is provided below after a description of the passenger compartment 10, the center console 12, the trim panel 14 and various elements of the storage compartment assembly 16.

Figure 2:
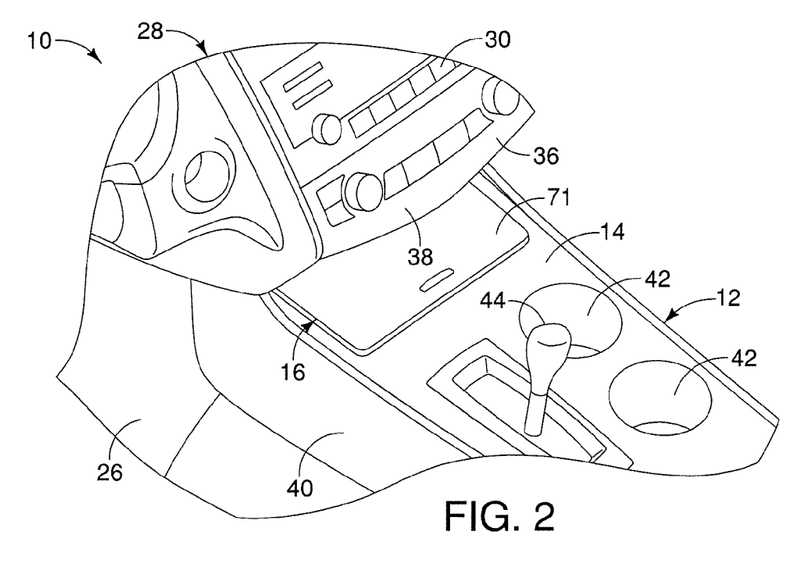
FIG. 2 is a perspective view of a portion of the passenger compartment showing the center console, the trim panel and a portion of the instrument panel above the storage compartment assembly in accordance with the first embodiment.

A brief description of the passenger compartment 10 is now provided with reference to FIGS. 1 and 2. The passenger compartment 10 is defined within the vehicle and includes, among other things, a floor 26, an instrument panel 28 (also referred to as a dashboard), the center console 12 and vehicle seats (not shown).

The instrument panel 28 is a conventional assembly that includes, for example, an audio system control panel 30, a steering column 32, a glove box 34, concealed air bags (not shown) and a climate control panel 36. The instrument panel 28 can include a variety of other conventional components, such as windshield wiper controls, light controls, etc. Description of such components is omitted for the sake of brevity.

As shown in FIG. 1, the steering column 32 extends rearward from the instrument panel 28 into the passenger compartment 10. The audio system control panel 30, the concealed air bags, the glove box 34 and the climate control panel 36 are all supported within or housed by the instrument panel 28 in a conventional manner.

The instrument panel 28 further includes a central overhang 38 that extends rearward within the passenger compartment 10, extending over the center console 12, as best shown in FIGS. 3 and 4. In the depicted embodiment the audio system control panel 30 and the climate control panel 36 are installed within the central overhang 38 of the instrument panel 28 above the center console 12.

It should be understood from the drawings and the description herein that the audio system control panel 30 is operably connected to an audio system (not shown) within the vehicle. The audio system includes non-depicted features such as, for example, speakers, a radio, a CD player and an audio input, with some or all of those features being provided within the passenger compartment 10. More specifically, the audio system is configured to provide music and/or other audio features for the entertainment of passengers within the passenger compartment 10. Since such audio systems are conventional vehicle features, further description is omitted for the sake of brevity.

It should also be understood from the drawings and the description herein that the climate control panel 36 is operably connected to heating and cooling systems (not shown) within the vehicle for controlling heating and cooling of the passenger compartment 10. Since such heating and cooling systems are conventional vehicle features, further description is omitted for the sake of brevity.

A brief description of the center console 12 is now provided with reference to FIGS. 1-4. The center console 12 includes, among other things, a main body 40, the trim panel 14 and the storage compartment assembly 16. The main body 40 is preferably installed to the floor 26 in a conventional manner by, for example, fasteners (not shown). As best indicated in FIGS. 3 and 4, the majority of the storage compartment assembly 16 is disposed within the forward section of the center console 12. The trim panel 14 covers a top portion of the main body 40.

The main body 40 is basically a conventional box-like support structure that includes various decorative elements, such as side trim panels and the trim panel 14 that provides the center console 12 with a desired aesthetic appearance. The main body 40 includes concealed structural elements (not shown) that provide attachments points for the storage compartment assembly 16 and the trim panel 14. More specifically, the storage compartment assembly 16 and the trim panel 14 are attached to the main body 40 via fasteners and/or snap-fitting elements (not shown) in a conventional manner.

As best shown in FIGS. 3 and 4, the central overhang 38 of the instrument panel 28 extends rearward over a portion of the forward section of the center console 12 and over the storage compartment assembly 16. More specifically, the central overhang 38 of the instrument panel 28 extends rearward over the majority of the storage compartment assembly 16.

As best shown in FIGS. 5, 9-12 and 19, the trim panel 14 is contoured and dimensioned to cover a majority of an upper surface of the main body 40 of the center console 12. The trim panel 14 includes, among other things, cup holders 42, an opening for a transmission shift control 44, an access opening 46 (shown in FIGS. 5, 10-12 and 19), a flange 48 and an exposed or upper surface 50. As mentioned above, the trim panel 14 attaches to the main body 40 via fasteners and/or snap-fitting projections. Since such fastening means are conventional in nature, further description is omitted for the sake of brevity.

Figure 9:
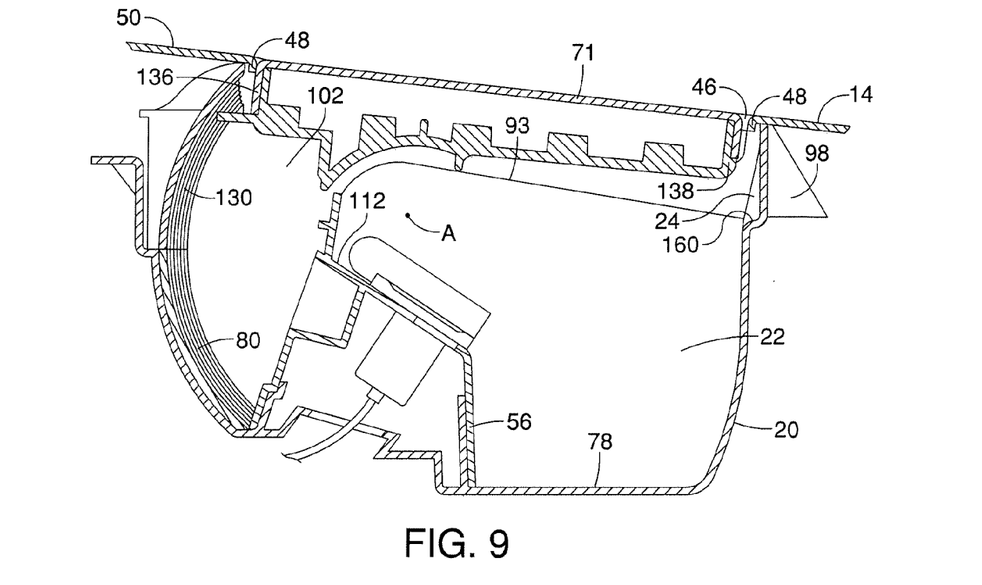
FIG. 9 is a side cross sectional view of the center console showing the storage compartment assembly, the trim panel and a flange of the trim panel extending into an access opening of the storage compartment assembly, with the lid in the closed position covering the storage compartment in accordance with the first embodiment.
Figure 10:
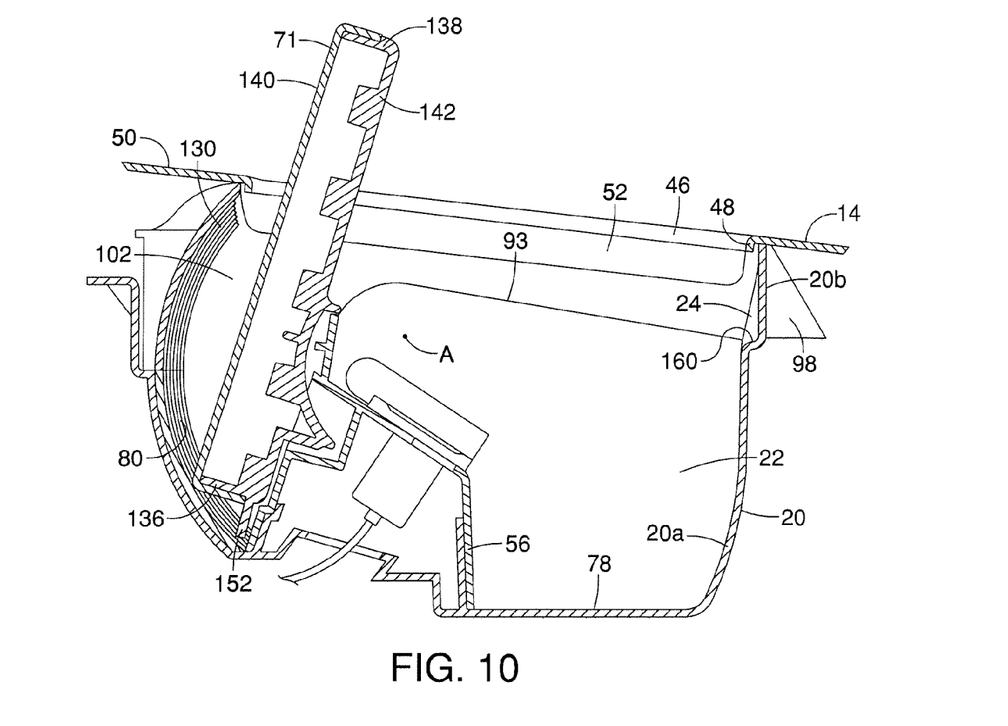
FIG. 10 is another side cross sectional view of the center console similar to FIG. 9, showing the storage compartment assembly, the trim panel and the flange of the trim panel extending into the access opening of the storage compartment assembly, with the lid in the opened position exposing the storage compartment in accordance with the first embodiment.
Figure 11:
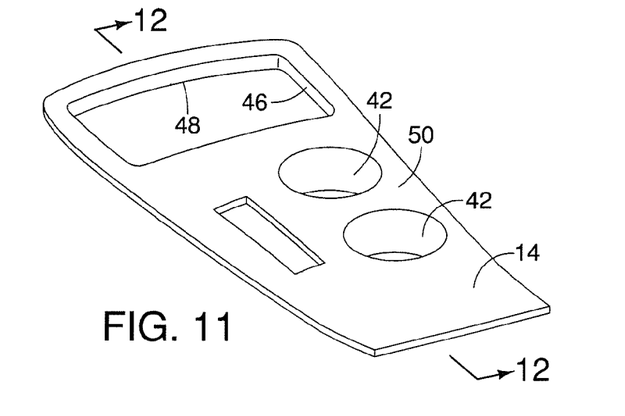
FIG. 11 is a perspective view of the trim panel removed from the center console, showing a second access opening and the flange surrounding the second access opening in accordance with the first embodiment.
Figure 12:
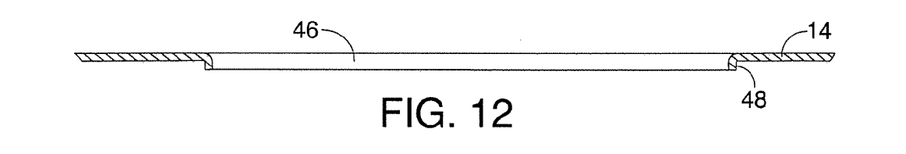
FIG. 12 is a cross-sectional view of a section of the trim panel showing the flange in accordance with the first embodiment.
Figure 19:
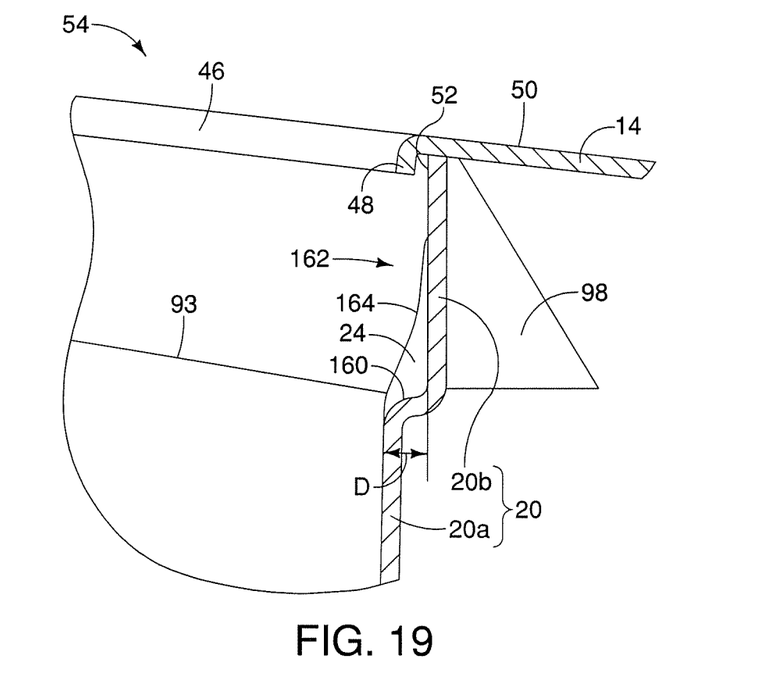
FIG. 19 is a side cross-sectional view of the center console similar to FIG. 18, showing the flange of the trim panel and features of the housing including the wall, the ledge and the plurality of ribs in accordance with the first embodiment.

The access opening 46 is dimensioned to coincide with a similar access opening 52 of the storage compartment assembly 16, as is described in greater detail below with the description of the storage compartment assembly 16. The flange 48 is shaped to surround the access opening 46 and extends downward from the upper surface 50. Specifically, with the trim panel 14 installed along with the storage compartment assembly 16 to the center console 12, the flange 48 extends into the access opening 52, as shown in FIGS. 9, 10 and 19. In the depicted embodiment, the flange 48 extends completely around the access opening 46, thereby defining the access opening 46. However, it should be understood from the drawings and the description herein that the flange 48 can alternatively be shaped to only partially surround the access opening 46. For example, the flange 48 can be shaped to extend along a rear edge and side edges of the access opening 46, and can be omitted from a front edge or front region of the access opening 46. In particular, the flange 48 is optional in the regions of the access opening 46 covered or obscured by the central overhang 38 of the instrument panel 28. However for aesthetic purposes, it is preferable that the flange 48 extends at least along the sides and rear edge of the access opening 46.

A description of the storage compartment assembly 16 is now provided with respect to FIGS. 6-10. The storage compartment assembly 16 basically includes a housing 54, a partition wall 56, an insert 58, a latch member 60, a damping wheel 62, a damping device 64, hinge shafts 66, a first accessory interface 68 (e.g., a universal serial bus USB connector or other data communications interface), a second accessory interface 70 (e.g., an electrical socket or other power supply interface) and a lid 71.

Figure 6:
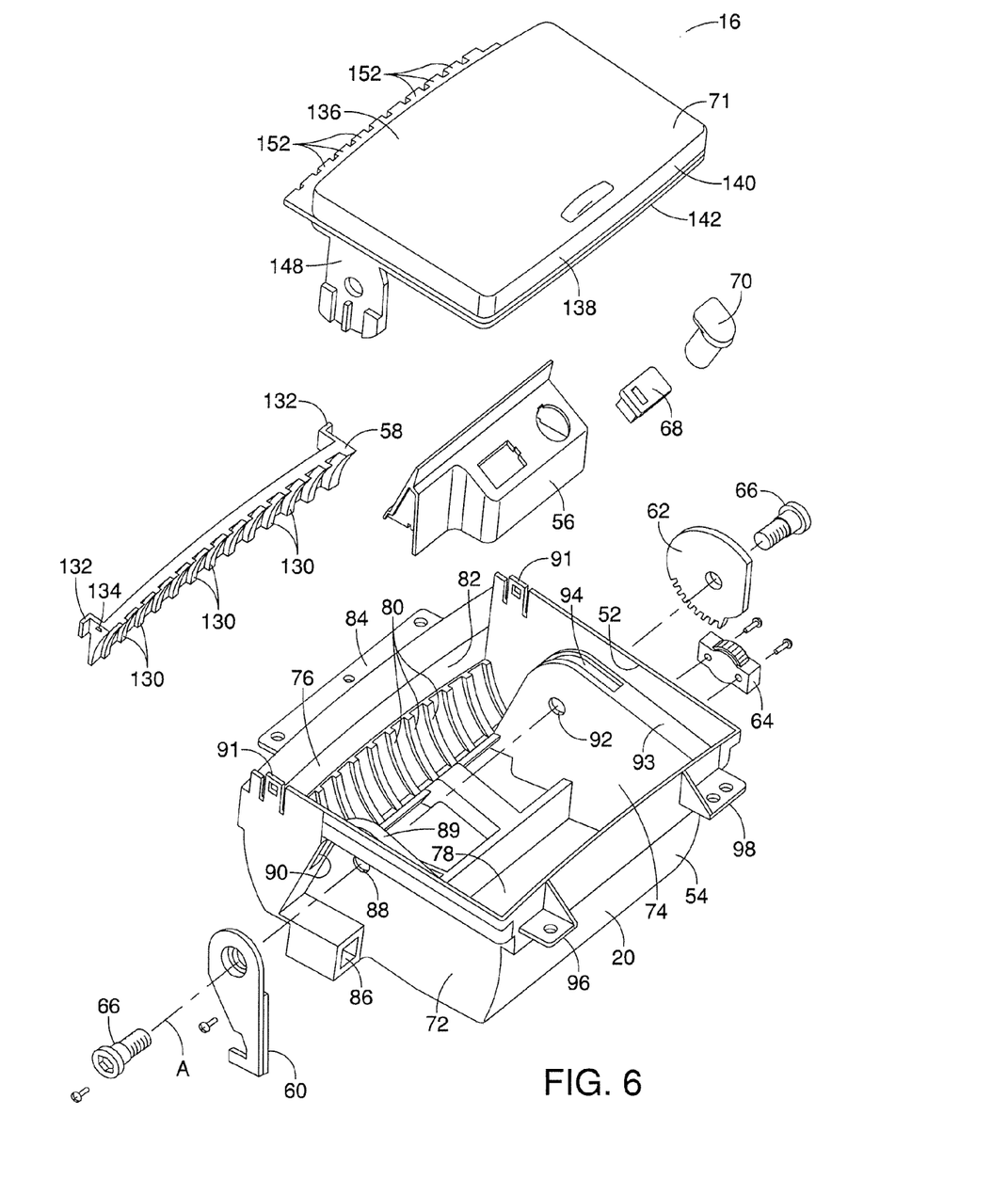
FIG. 6 is an exploded perspective view of the storage compartment assembly removed from the center console showing the lid, a housing, a lid cavity, a storage compartment, a partition wall, an insert and elements of a hinge assembly in accordance with the first embodiment.
Figure 7:
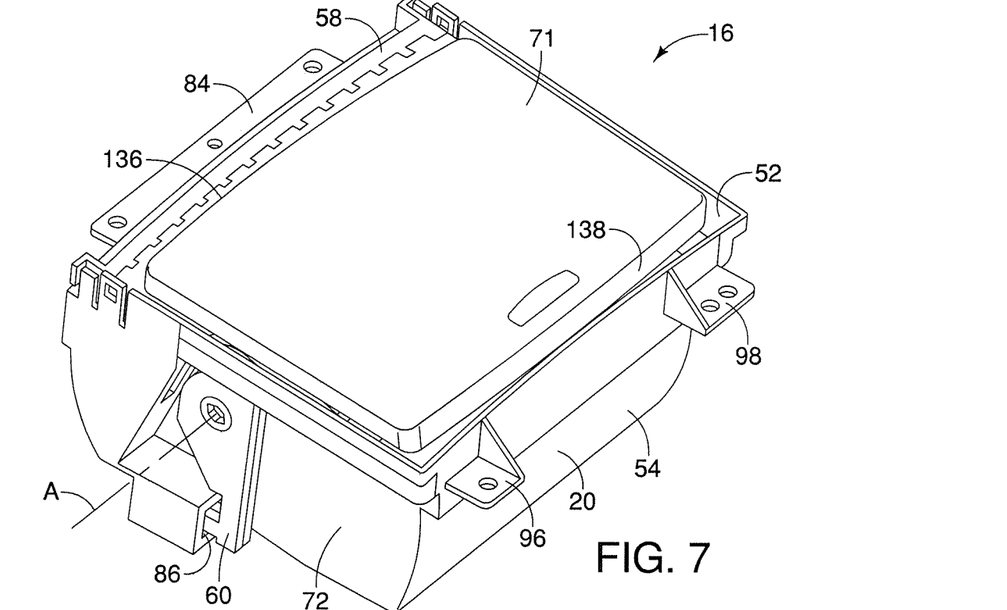
FIG. 7 is a perspective view of the storage compartment assembly removed from the center console, showing the lid and the housing of the storage compartment assembly with the lid in the closed position in accordance with a first embodiment.
Figure 8:
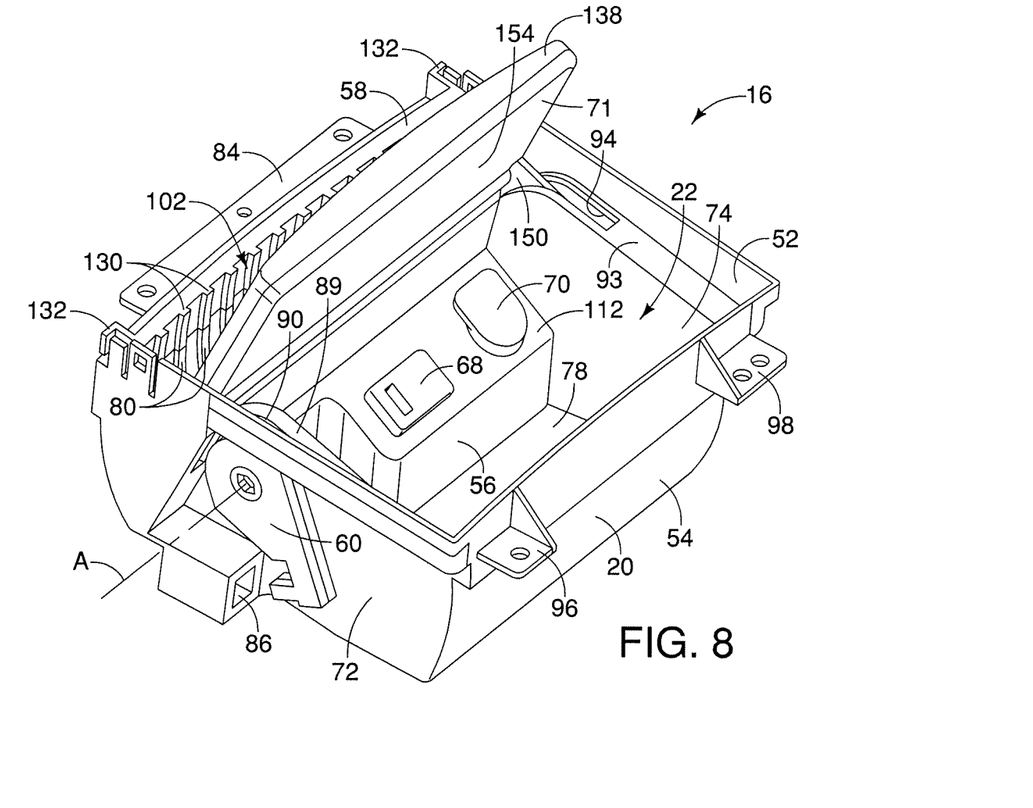
FIG. 8 is another perspective view of the storage compartment assembly removed from the center console, showing the lid in the open position revealing a lid cavity, the storage compartment and the partition wall separating the lid cavity from the storage compartment in accordance with the first embodiment.

With specific reference to FIGS. 6-8, a more detailed description of the housing 54 is now provided. The housing 54 is, for example, a molded plastic box-like structure with an open top, as shown in FIG. 8. The housing 54 can be made of any of a variety of materials, such as plastic, metal, metal alloys, polymers and/or composite materials. The housing 54 includes the wall 20 (hereinafter referred to as the rear wall 20), a first side wall 72, a second side wall 74, a front wall 76 and a bottom wall 78. Upper edges of the rear wall 20, the first side wall 72, the second side wall 74 and the front wall 76 define and surround the access opening 52.

As best shown in FIG. 6, a portion of the front wall 76 of the housing 54 includes a plurality of spaced apart arcuately shaped ribs 80, a vertical support wall 82 and an attachment flange 84. The ribs 80 are about an axial center that coincides with an axis A. The axis A preferably extends in a horizontal direction relative to the vehicle. Consequently, the ribs 80 extend in at least partially in a vertical direction. The lid 71 pivots about the axis A.

The vertical support wall 82 is dimensioned to provide support for the insert 58, as is described below. The attachment flange 84 includes a plurality of fastener receiving apertures that are employed to attach the storage compartment assembly 16 to the main body 40 of the center console 12 in a conventional manner.

The first side wall 72 includes a recess 86, an aperture 88, a bumper ledge 89, a bumper B, a slot 90 and a tab 91. The recess 86 retains a latch mechanism (not shown) that retains the lid 71 in the closed position, as described in greater detail below. The aperture 88 defines the axis A and is threaded to receive one of the hinge shafts 66 about which the lid 71 pivots. The bumper ledge 89 is a contoured surface that extends forward from the rear wall 20 toward the front wall 76. At the rear wall 20, the bumper ledge 89 is flat, but curves downward as it approaches the front wall 76. The slot 90 is formed in the bumper ledge 89 and is dimensioned to receive a portion of the lid 71. The tab 91 is provided so that the insert 58 can snap-fit into the housing 54. The bumper B is preferably a soft, elastomeric material installed in corresponding recess (not shown) of the ledge 89, as described further below.

Similarly, the second side wall 74 includes another tab 91, an aperture 92, a bumper ledge 93, another bumper B and a slot 94. The aperture 92 and the aperture 88 define the axis A. The aperture 92 is also dimensioned to receive one of the hinge shafts 66 about which the lid 71 pivots. The bumper ledge 93 is a contoured surface that extends forward from the rear wall 20 toward the front wall 76. The slot 94 is formed in the bumper ledge 93. Like the slot 90, the slot 94 is dimensioned to receive a portion of the lid 71. The bumpers B are preferably made of a soft, elastomeric material received in recesses (not shown) of the ledges 89 and 93, and they extend above the ledges 89 and 93 to contact the inner surface 154 of the lid 71 when moving to the closed position. The bumpers maintain the inner surface 154 of the lid 71 at a distance from the ledges 89 and 93 to keep the lid 71 from contacting the ledges 89 and 93 and possibly generating noise and/or vibrations. The bumpers B can also be tuned to maintain a proper fit and finish of the lid 71 to the trim panel 14 when the lid 71 is in the closed position.

An outer surface of the rear wall 20 includes attachment flanges 96 and 98 with corresponding fastener receiving apertures that are employed to attach the storage compartment assembly 16 to the center console 12 in a conventional manner. A further description of the rear wall 20 and the plurality of ribs 24 is provided below, after description of the remainder of the housing 54 and elements of the storage compartment assembly 16.

As shown in FIG. 6, the partition wall 56 is a separate member from the housing 54. It should be understood from the drawings and the description herein that the housing 54 and the partition wall 56 can be manufactured as a single monolithic element. However, in the depicted embodiment, the partition wall 56 and the housing 54 are separate elements. The partition wall 56 is dimensioned to snap fit in place within the housing 54 thereby dividing the housing 54 into two sections defining the storage compartment 22 and a lid cavity 102.

As shown in FIG. 8, the partition wall 56 includes an accessory surface 112 located within the storage compartment 22 and is further spaced apart from and above the bottom wall 78 (a lower end) of the storage compartment 22 with the partition wall 56 installed within the housing 54. The accessory surface 112 includes a first and second openings dimensioned to receive the first and second accessory interfaces 68 and 70.

The first accessory interface 68 can include a USB connector, which would typically be connected to the audio system controlled by the audio system control panel 30. The first accessory interface 68 can connect to an audio device such as an MP3 player or other audio producing device. The first accessory interface 68 can be configured to connect to other devices such as a CD player or a personal computer. Consequently as a result of being installed to the accessory surface 112, the first accessory interface 52 is located within the storage compartment 22 of the storage compartment assembly 16. Therefore, relatively small devices connected to the first accessory interface 68 can be placed within the storage compartment assembly 16 while in use and with the lid 71 in the open position. Similarly, such devices can also be conveniently concealed within the storage compartment 12 with the lid 71 in the closed position.

The second accessory interface 70 can be an electrical socket, which would typically be connected to the battery of the vehicle or to one or more electrical systems within the vehicle. In this case, the second accessory interface 70 can provide electrical current that powers accessories or other devices such as the above mentioned MP3 player, a telephone recharging adaptor, or other similar devices as desired by a passenger or driver in the passenger compartment 10. For example, the second accessory interface 70 can provide 12 volts of electrical potential, 110 volts of electrical potential or energy having other voltage characteristics. As with the first accessory interface 68, since the second accessory interface 70 is provided within the storage compartment 22 of the storage compartment assembly 16, any device connected to the second accessory interface 70 can be placed within the storage compartment assembly 16 while in use and with the lid 71 in the open position. Similarly, such a device can also be conveniently concealed within the storage compartment assembly 16 with the lid 71 in the closed position.

It should be understood from the drawings and the description herein that the housing 54 and the insert 58 can be manufactured as a single monolithic element. However, in the depicted embodiment, the insert 58 and the housing 54 are separate elements. The insert 58 is dimensioned to snap fit in place within the housing 54 and against the vertical support wall 82 of the front wall 76 of the housing 54.

The insert 58 includes a plurality of extension ribs 130, a pair of projections 132 and a pair of snap fitting projections 134. The plurality of extension ribs 130 are dimensioned and positioned to align with the plurality of ribs 80 of the front wall 76 of the housing 54. Lower ends of the plurality of ribs 130 match the profile of upper ends of the plurality of ribs 80. Hence when installed in the housing 54, the plurality of ribs 80 and the plurality of ribs 130 form generally continuous first ribs that extend upward from a lower end of the lid cavity 102 to an upper end of the lid cavity 102.

A description of the lid 71 is now provided with specific reference to FIGS. 6 and 9-10. The lid 71 basically includes a first end 136, a second end 138, an outer section 140 and an inner section 142. The outer section 140 is preferably cosmetically configured to match an outer surface of the center console 12 and the trim member 14. The outer section 140 and inner section 142 are fixedly attached to one another by fasteners (not shown), adhesives and/or by another fastening technique such as sonic welding. The outer section 140 and inner section 142 can also be snap-fitted to one another in a conventional manner.

The inner section 142 of the lid 71 includes a pair of hinge projections 148 and 150, a plurality of second ribs 152 and an inner surface 154. The hinge projections 148 and 150 extend from opposite side edges thereof, with the inner surface 154 extending therebetween.

The lid 71 is moveable between a closed position (FIGS. 1-3, 5, 7 and 9) and an open position (FIGS. 4, 8 and 10). The lid cavity 102 partially conceals a portion of the lid 71 within the storage compartment assembly 16 when the lid 71 is in the open position. Further, in the closed position, the lid 71 fits within the access opening 46 of the trim panel 14 and within the access opening 52 of the housing 54. In the open position, the majority of the access opening 46 of the trim panel 14 and the access opening 52 of the housing 54 are exposed.

When the lid 71 is installed to the housing 54, the hinge projection 148 is inserted into the slot 90 of the first side wall 72 of the housing 54. Hence, once installed to the housing 54, the hinge projection 148 extends along an exterior surface of the first side wall 72. The latch member 60 is then fixed to the hinge projection 148 with one of the hinge shafts 66 extending therethrough and into the aperture 88 of the housing 54. Similarly, when the lid 71 is installed to the housing 54, the hinge projection 150 is inserted into the slot 94 of the second side wall 74 of the housing 54. Hence, once installed to the housing 54, the hinge projection 150 extends along an exterior surface of the second side wall 74. The damping wheel 62 is then fixed to the hinge projection 150 with the other one of the hinge shafts 66 extending therethrough and into the aperture 92 of the housing 54. Thus, the lid 71 pivots about the hinge shafts 66 and the axis A. Further, it should be understood from the drawings and the description herein that the axis A is closer to the first end 136 of the lid 71 than to the second end 138 of the lid 71.

With the storage compartment assembly 16 fully assembled, as shown in FIGS. 7 and 8, the lid 71 is pivotally secured to the housing 54 for movement about the axis A. The latch member 60 includes a projection that protrudes into the recess 86 with the lid 71 in the closed position. The recess 86 includes a latch mechanism that retains the lid 71 in the closed position by engagement with the projection of the latch member 60. Although not shown, the damping wheel 62 is secured to the hinge projection 150 of the lid 71 such that the damping wheel 62 engages gear teeth on the damping device 64. The damping device 64 is configured to bias the lid 71 for movement toward the open position and dampen movement of the lid 71 such that it opens with a predetermined rate of movement. Since the latch mechanism within the recess 86 and the damping device 64 are conventional mechanisms, further description is omitted for the sake of brevity.

The plurality of second ribs 152 are formed along one end or edge of the inner section 142 of the lid 71. With the lid 71 installed, the second ribs 152 extend into spaces between corresponding ones of the first ribs (the ribs 80 of the housing 54 and the ribs 130 of the insert 58). The plurality of second ribs 152 of the lid 71 are dimensioned to extend between adjacent ones the first ribs 80 and 130, such that the second ribs 152 move along the respective spaces defined between the first ribs 80 and 130 as the lid 71 moves between the open position and the closed position.

In other words, since the ribs 80 and 130 have an arcuate shape centered about the axis A, the second ribs 152 sweep between the first ribs (the ribs 80 and 130) as the lid 71 is moved. One of the benefits of the relationship between the first ribs (the ribs 80 and 130) and the second ribs 152 is that any item or items located on the lid 71 and possibly concealed under the central overhang 38 of the instrument panel 28 are captured by the second ribs 152 and prevented from remaining within the lid cavity 102. For example, with the lid 71 in the open position, if a pen or pencil falls into an exposed section of the lid cavity 102 with the lid 71 in the open position, the ribs 80 and 130 along with the second ribs 152 will prevent the pen or pencil from falling down below the second ribs 152. As the lid 71 is moved to the closed position, the second ribs 152 push the pen or pencil upward and out of the lid cavity 102. Thus, it is difficult, if not impossible, for items to become trapped or lodged within the lid cavity 102.

Figure 13:
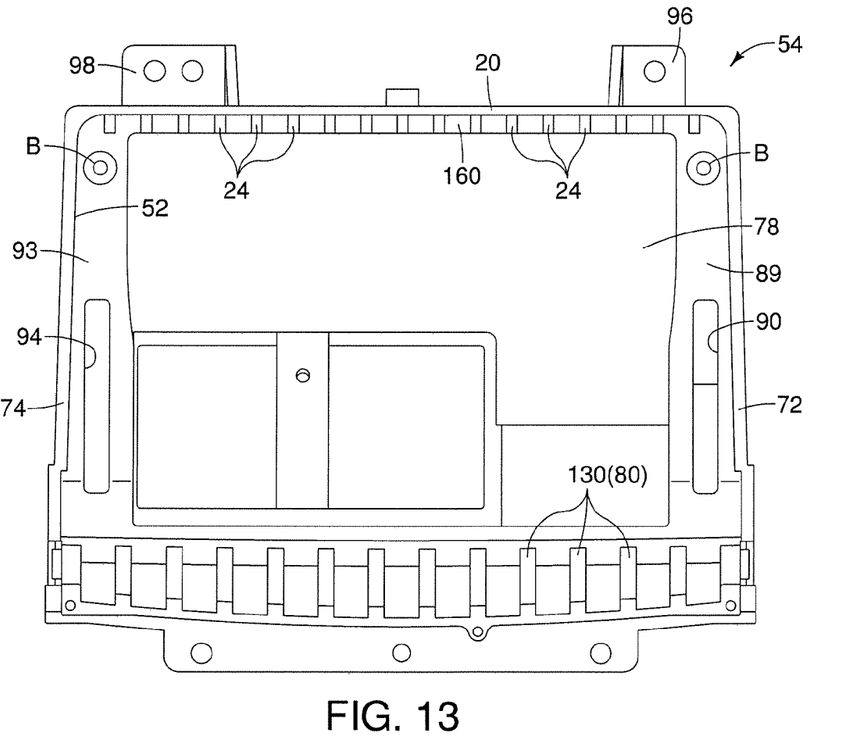
FIG. 13 is a top view of the housing with the lid removed showing a wall that partially defines the storage compartment, a ledge formed on the wall and a plurality of ribs extending upward from the ledge in accordance with the first embodiment.
Figure 14:
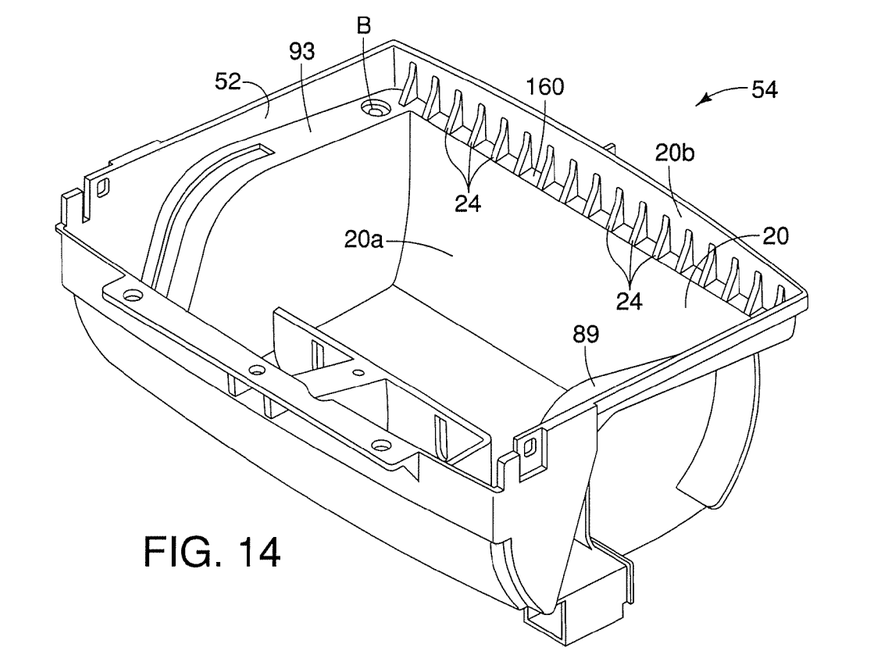
FIG. 14 is a perspective view of the housing from a reverse angle showing the wall, the ledge and the plurality of ribs in accordance with the first embodiment.
Figure 15:
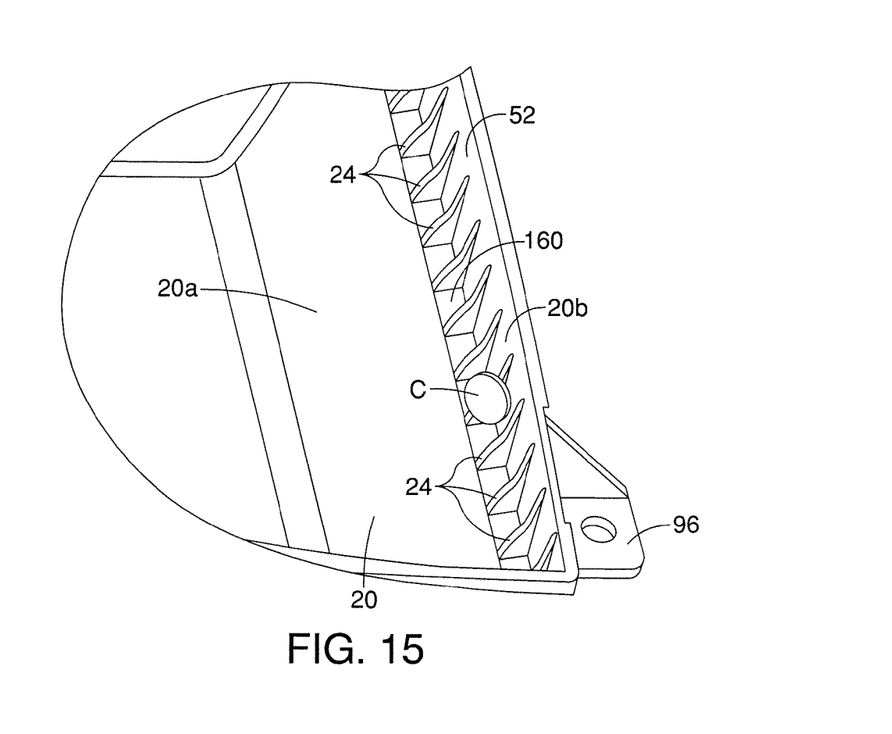
FIG. 15 is another perspective view of the housing showing the wall, the ledge and the plurality of ribs, with a coin tilted against one of the ribs making it easy to remove the coin in accordance with the first embodiment.

A more detailed description of the rear wall 20 and the plurality of ribs 24 is provided now with specific reference to FIGS. 13-19. The rear wall 20 of the housing 54 includes a step or ledge 160 within the storage compartment 22. The ledge 160 is generally horizontal and defines an offset between a lower section 20a of the rear wall 20 and an upper section 20b of the rear wall 20. The ledge 160 is located within the storage compartment 22 and is spaced apart from the access opening 52 (a first access opening). As best shown in FIGS. 13 and 14, the bumper ledge 89, the ledge 160 and the bumper ledge 93 basically form a continuous surface within the housing 54, with the plurality of ribs 24 being located between the bumper ledges 89 and 93. In other words, the ledge 160 and the bumper ledges 89 and 93 defining a single ledge surface. Consequently, the bumper ledge 89 and the bumper ledge 93 extend from opposing ends of the ledge 160.

The bumper ledges 89 and 93 and the ledge 160 are all spaced apart from the access opening 52 of the housing 54. As best shown in FIG. 9, the lid 71 is arranged such that with the lid 71 in the closed position, portions of side edges of the lid 71 are positioned adjacent to respective ones of the bumper ledges 89 and 93, and the second end 138 of the lid 71 is positioned adjacent to ledge 160. However, with the lid 71 in the open position as indicated in FIG. 10, the side edges of the lid 71 are spaced apart from the bumper ledges 89 and 93, and the second end 138 of the lid 71 is spaced apart from ledge 160.

As best shown in FIG. 19, the plurality of ribs 24 extend upward from the ledge 160 along the upper section 20b of the rear wall 20 toward the lower end of the flange 48 of the trim panel 14. As is further shown in FIG. 19, the lower end of the flange 48 and the ledge 160 define a recess 162, with the plurality of ribs 24 being disposed within the recess 162.

Figure 18:
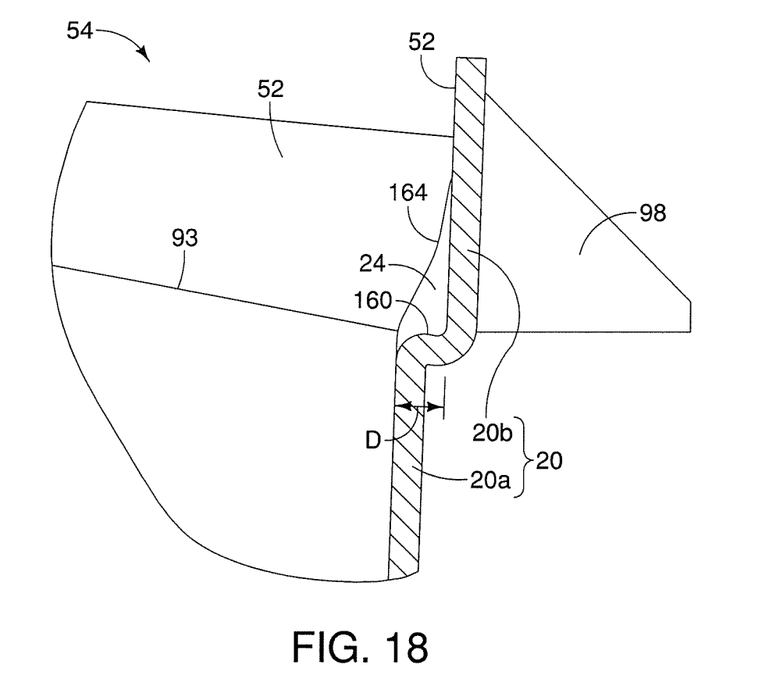
FIG. 18 is an enlarged side cross-sectional view of a portion of the housing showing features of the wall, the ledge and the plurality of ribs in accordance with the first embodiment.

As shown in both FIGS. 18 and 19, the plurality of ribs 24 have a tapered shape, such that at the ledge 160 the ribs 24 are wider than at an upper end of the ribs 24. Further, the plurality of ribs 24 have a horizontal depth D measured along the ledge 160, perpendicular to the upper section 20b the rear wall 20. However, at an upper end of the plurality of ribs 24 proximate the flange 46, the ribs 24 have a depth that is basically nothing, such that the depth D is greater than the depth of the ribs 24 at any other point along their vertical length. As is also shown in FIGS. 18 and 19, each of the plurality of ribs 24 has a distal edge 164 that has a non-linear shape as viewed from the side.

Figure 16:
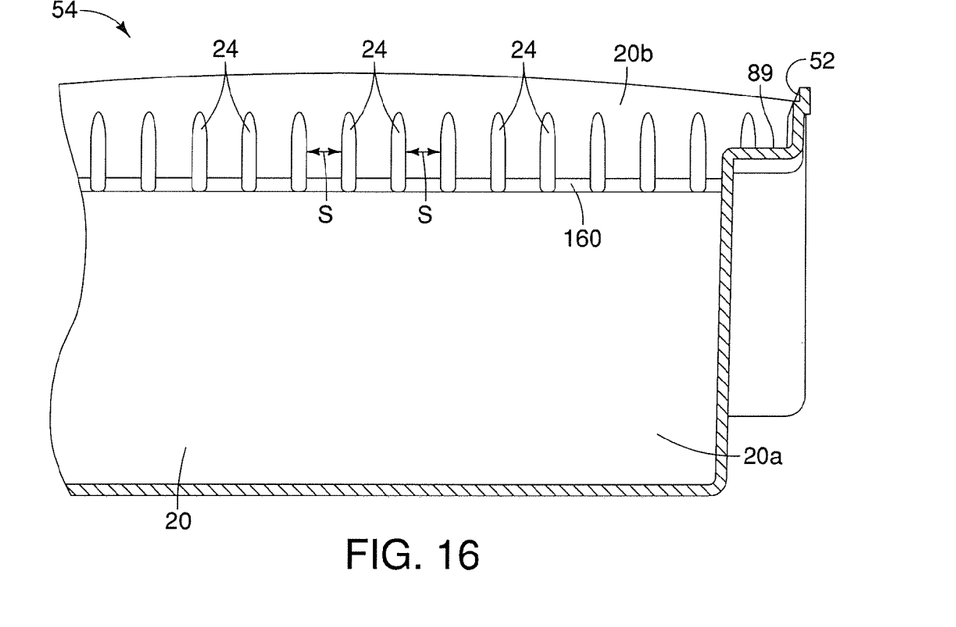
FIG. 16 is a cross-sectional front view of the housing showing features of the wall, the ledge and the plurality of ribs in accordance with the first embodiment.
Figure 17:
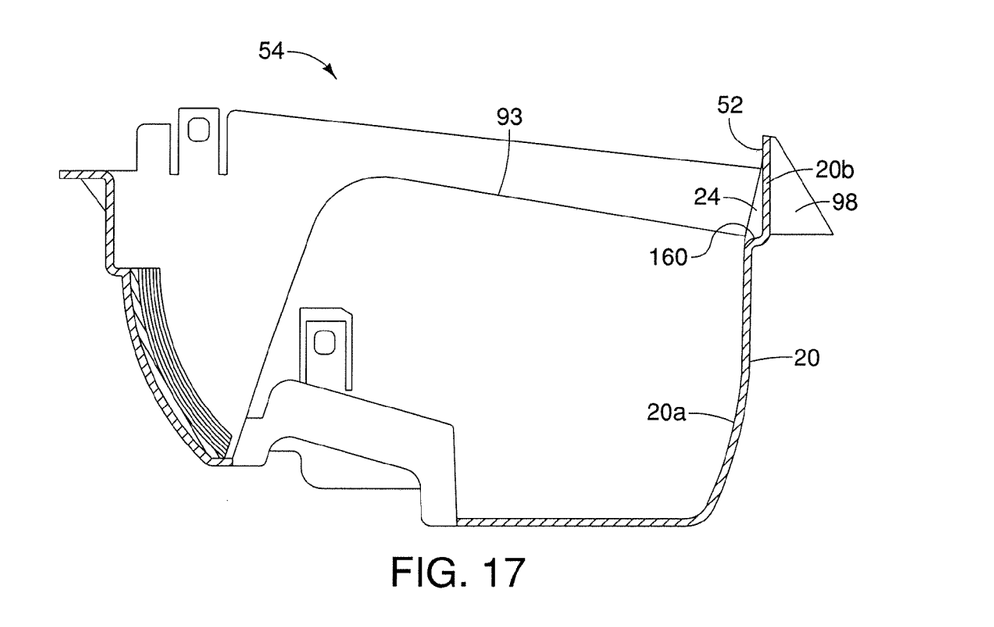
FIG. 17 is a side cross-sectional view of the housing showing features of the wall, the ledge and the plurality of ribs in accordance with the first embodiment.

As shown in FIG. 16, adjacent ones of the plurality of ribs are spaced apart from one another along the rear wall 20 by a distance S. The distance S is preferably less than fifteen millimeters, but can alternatively be less than ten millimeters. The distance S is also preferably selected to be small enough to prevent objects commonly stored in the storage compartment 22 from entering the space between the ribs 24, but large enough to allow a passenger's fingers to enter the space between the ribs 24 so that the passenger can guide the objects into the passenger's hand during removal.

As shown in FIG. 19, the flange 48 at least partially surrounds the access opening 52 with the trim panel 14 installed to the center console 12. The flange 48 further extends into the access opening 52 with the flange 48 being spaced apart from the ledge 160 thereby defining the recess 162. The plurality of ribs 24 are positioned between the flange 48 and the ledge 160, to assist in the retrieval of small objects within the storage compartment 22 of the storage compartment assembly 16. Specifically, when a small object such as a coin C (see FIG. 15) is located within the storage compartment 22, there is a tendency for the coin C (and other small objects) to slide up the rear wall 20 and remain flat against the surface of the rear wall 20 (in the absence of the ribs 24). Further there is also a tendency for small objects to become trapped below the flange 46 and against the rear wall 20, or become trapped between the flange 46 and an upper edge of the rear wall 20. However, with the inclusion of the plurality of ribs 24, the coin C can be tilted or pivoted against one of the ribs 24, with one edge of the coin C moving into the space between two adjacent ones of the plurality of ribs 24. When pivoted in this manner, the coin C is easily removed from the storage compartment 22. Without the ribs 24, small objects like the coin C can be difficult to remove.

As shown in the drawings, the rear wall 20, the ribs 24 and the ledge 160 are located in a rearward area of the storage compartment assembly 16 and are vertically oriented in an installed position. However, it should be understood from the drawings and the description herein that the ribs 24 and the ledge 160 can also be oriented in different positions.

It should also be understood that the rear wall 20 can be provided with any of a variety of shapes that accomplish the task provided by the plurality of ribs 24. While the shape of the ribs 24 is a convenient shape to assist in the removal of small objects, it is one example of a shaped surface. Other shaped surfaces are also within scope of the invention.

For example, the rear wall 20 can be provided with an undulating surface having a sinusoidal shape when viewed from above to make it easier to remove small objects.

Second Embodiment

Referring now to FIGS. 20 thru 23, a passenger compartment 10' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

The passenger compartment 10' includes a center console 12' and an instrument panel 28' that have many of the same features as the center console 12 and the instrument panel 28 of the first embodiment. However, the center console 12' and the instrument panel 28' have been modified slightly such that the storage compartment assembly 16 has been installed at an approximate intersection between the center console 12' and the instrument panel 28'. In other words, one, or both of the center console 12' and the instrument panel 28' include support structures (not shown) that support the storage compartment assembly 16 with the rear wall 20 being approximately oriented in a horizontal orientation, as indicated in FIGS. 22 and 23.

Figure 20:
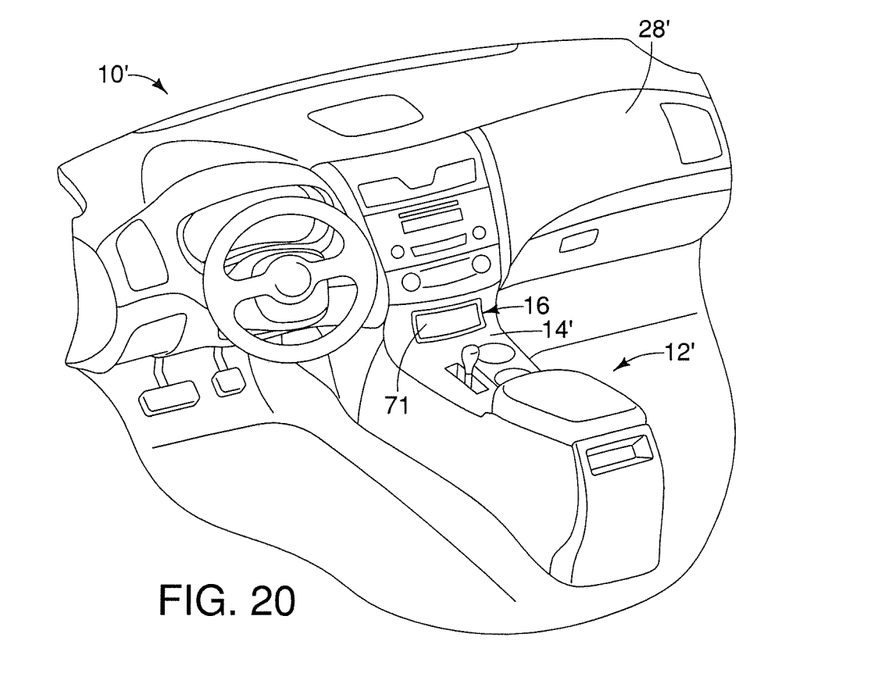
FIG. 20 is a perspective view of a passenger compartment of a vehicle showing an instrument panel and a center console that includes a storage compartment assembly with a lid in a closed position, and a trim panel in accordance with a second embodiment.
Figure 21:
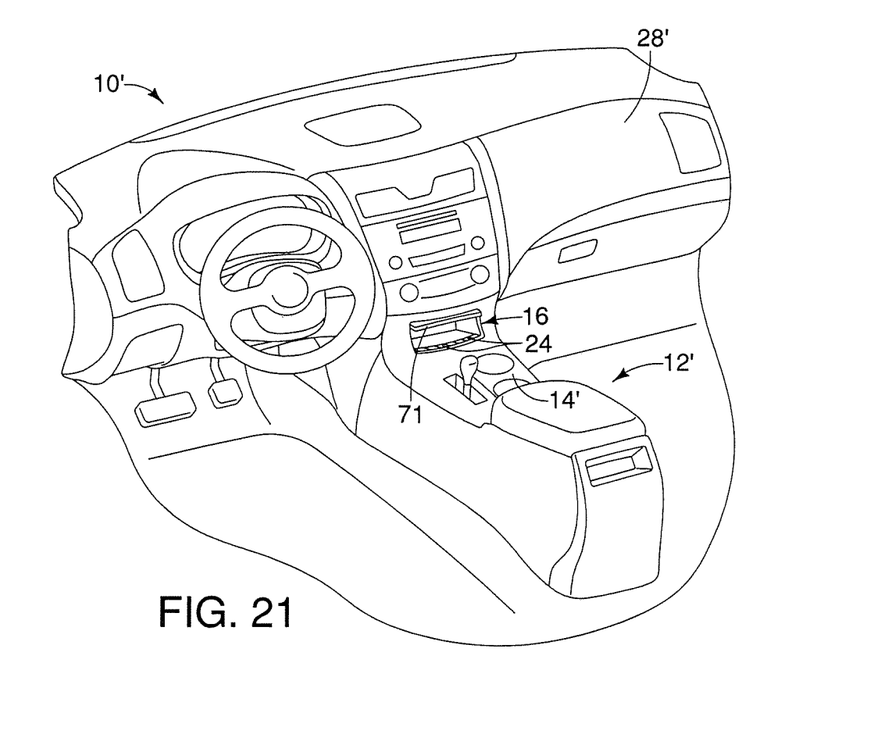
FIG. 21 is another perspective view of the passenger compartment similar to FIG. 20 showing the lid in an opened position revealing a wall within a storage compartment and a plurality of ribs in accordance with the second embodiment.
Figure 22:
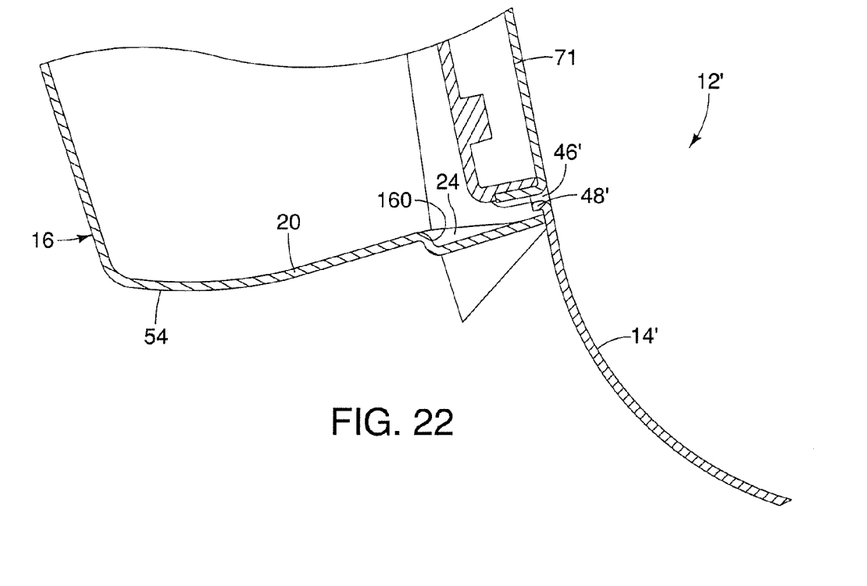
FIG. 22 is a side view of a portion of the instrument panel and the center console depicted in FIGS. 20 and 21, showing the storage compartment, the wall and the plurality of ribs, with the lid in the closed position in accordance with the second embodiment.
Figure 23:
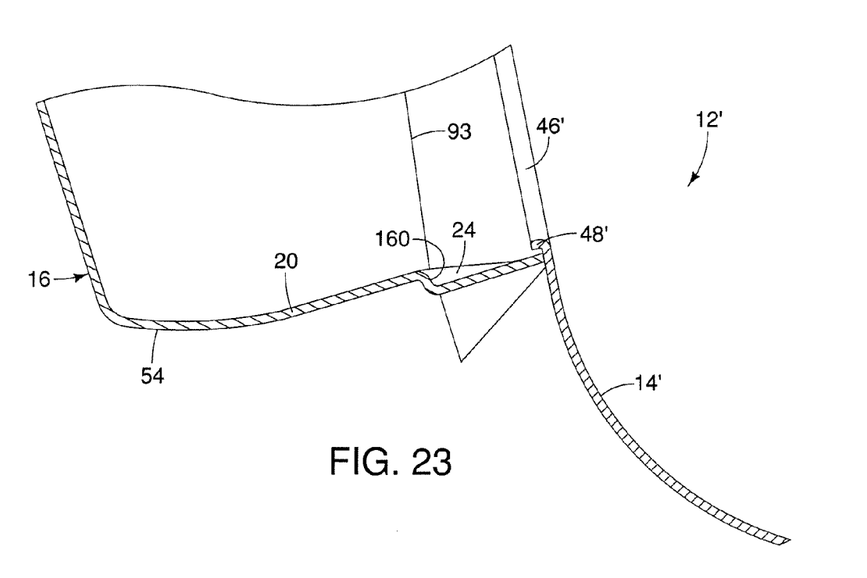
FIG. 23 is another side view of a portion of the instrument panel and the center console depicted in FIGS. 20 and 21, showing the storage compartment, the wall and the plurality of ribs, with the lid in the opened position in accordance with the second embodiment.

In FIGS. 22 and 23, the rear wall 20 is inclined slightly relative to horizontal. However, the storage compartment assembly 16 can be installed with the rear wall 20 extending in a horizontal direction. Consequently, the ledge 160 can be positioned to extend in an approximately vertical orientation, as indicated in FIGS. 22 and 23. A modified trim panel 14' covers the storage compartment assembly 16 and portions of the center console 12', as indicated in FIGS. 20 and 21. The modified trim panel 14' includes an access opening 46' and a flange 48', as shown in FIGS. 22 and 23. Further, the ribs 24 extend horizontally along the wall 20 from the ledge 160 and toward the flange 48'.

Thus, with the wall 20 in a horizontal orientation, the plurality of ribs 24 make it easier to retrieve and remove small objects from the storage compartment assembly 16.

The drawings show various features of the vehicle and the passenger compartments 10 and 10' that are conventional components and that are well known in the art. Since such features are well known in the art, these structures will not be discussed or illustrated in detail herein. Rather, it will be apparent to those skilled in the art from this disclosure that the components can be any type of structure that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the storage compartment assembly 16. Accordingly, these terms, as utilized to describe the present invention should be interpreted relative to a vehicle equipped with the storage compartment assembly 16.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle storage compartment assembly comprising:
   a housing defining a storage compartment area with a first access opening, the housing including a wall with a ledge that is located within the storage compartment area and that is spaced apart from the first access opening;
   a lid having a first end and a second end, the first end being pivotally coupled to the housing to move between an open position in which the second end is spaced apart from the ledge and a closed position in which the second end is located adjacent to the ledge;
   a trim member defining a second access opening, the trim member including a flange that at least partially surrounds the second access opening, the flange extending into the first access opening, the flange being spaced apart from the ledge such that a recess is defined by the wall of the housing between the flange and the ledge; and
   a plurality of ribs extending from the ledge of the wall toward the flange within the recess.

2. The vehicle storage compartment assembly according to claim 1, wherein
   the housing includes a pair of side walls facing one another, each of the side walls having a bumper ledge, the bumper ledges extending from opposing ends of the ledge, each of the bumper ledges being spaced apart from the first access opening, the ledge and the bumper ledges defining a ledge surface.

3. The vehicle storage compartment assembly according to claim 2, wherein
   the lid includes first and second side edges that are arranged such that with the lid in the closed position, portions of the first and second side edges and the second end of the lid are positioned adjacent to ledge surface.

4. The vehicle storage compartment assembly according to claim 2, wherein the plurality of ribs are located between the bumper ledges of the side walls.

5. The vehicle storage compartment assembly according to claim 1, wherein
   the plurality of ribs are formed on the ledge and extend from the ledge along the wall towards the flange of the trim panel.

6. The vehicle storage compartment assembly according to claim 1, wherein
   the plurality of ribs have a tapered shape.

7. The vehicle storage compartment assembly according to claim 6, wherein
   the plurality of ribs have a first depth measured along the ledge perpendicular to the wall, and a second depth at an end of the plurality of ribs proximate the flange, the first depth being greater than the second depth.

8. The vehicle storage compartment assembly according to claim 1, wherein
   the plurality of ribs have a first depth measured along the ledge perpendicular to the wall, and a second depth at an end of the plurality of ribs proximate the flange, the first depth being greater than the second depth.

9. The vehicle storage compartment assembly according to claim 1, wherein
   the plurality of ribs have distal edges having a non-linear shape as viewed from one side.

10. The vehicle storage compartment assembly according to claim 1, wherein
    the plurality of ribs are spaced apart from one another along the wall.

11. The vehicle storage compartment assembly according to claim 10, wherein
    the plurality of ribs are spaced apart from one another by a distance less than fifteen millimeters.

12. The vehicle storage compartment assembly according to claim 10, wherein
    the plurality of ribs are spaced apart from one another by a distance less than ten millimeters.

13. The vehicle storage compartment assembly according to claim 1, further comprising
    a vehicle center console with the housing being disposed within the vehicle center console.

14. The vehicle storage compartment assembly according to claim 13, wherein
    the trim member covers an upper portion of the vehicle center console and an upper portion of the housing.

15. The vehicle storage compartment assembly according to claim 13, wherein
    the wall of the housing is vertically oriented in an installed position.

16. The vehicle storage compartment assembly according to claim 15, wherein
    the ledge includes an upper surface that is horizontally oriented in an installed position.

17. The vehicle storage compartment assembly according to claim 13, wherein the wall and the ledge are located in a rearward area of the storage compartment area in an installed position.

18. The vehicle storage compartment assembly according to claim 13, wherein
the lid pivots about a pivot axis that is closer to a forward section of the housing than the wall of the housing.

19. The vehicle storage compartment assembly according to claim 13, wherein
the wall of the housing is horizontally oriented in an installed position and the ribs extend along the wall.

20. A vehicle storage compartment assembly comprising:
a housing defining a storage compartment area having an outer surface defining an access opening that provides access to the storage compartment area and an interior wall extending from the outer surface into the storage compartment area, the interior wall having a first portion adjacent to the outer surface, a second portion spaced from the outer surface, and a ledge extending between the first portion and second portion of the interior wall and spaced apart from the outer surface;
a lid having a first end and a second end, the first end being pivotally coupled to the housing to move between an open position in which the second end is spaced apart from the ledge and a closed position in which the second end is located adjacent to the ledge with the lid closing the access opening; and
a plurality of ribs extending from the ledge toward the access opening, wherein each of the plurality of ribs has a tapered shape decreasing in width from the ledge toward the access opening.

21. A vehicle storage compartment assembly comprising:
a housing defining a storage compartment area having an outer surface defining an access opening that provides access to the storage compartment area and an interior wall extending from the outer surface into the storage compartment area, the interior wall having a first portion adjacent to the outer surface, a second portion spaced from the outer surface, and a ledge extending between the first portion and second portion of the interior wall and spaced apart from the outer surface;
a lid having a first end and a second end, the first end being pivotally coupled to the housing to move between an open position in which the second end is spaced apart from the ledge and a closed position in which the second end is located adjacent to the ledge with the lid closing the access opening; and
a plurality of ribs extending from the ledge toward the access opening, wherein, each of the plurality of ribs has a non-linear shaped distal edge.

22. The vehicle storage compartment assembly according to claim 21, wherein, the distal edge of each of the plurality of ribs is continuous with an interior surface of the second portion of the interior wall.

* * * * *